United States Patent [19]

Uchino et al.

[11] Patent Number: 5,135,897
[45] Date of Patent: Aug. 4, 1992

[54] ELECTRO-OPTICAL EFFECT COMPOSITION

[75] Inventors: Kenji Uchino, Yokohama; Kazuyasu Hikita, Saitama; Mikiya Ono, Tokorozawa, all of Japan

[73] Assignee: Mitsubishi Materials Corporation, Tokyo, Japan

[21] Appl. No.: 659,743

[22] Filed: Feb. 20, 1991

[30] Foreign Application Priority Data

Feb. 22, 1990 [JP] Japan ................................ 2-39624

[51] Int. Cl.$^5$ ............................................ C04B 35/46
[52] U.S. Cl. ................................ 501/136; 252/62.9
[58] Field of Search ................ 252/62.9, 62.9 B; 501/134, 135, 136

[56] References Cited

U.S. PATENT DOCUMENTS

| | | | |
|---|---|---|---|
| 3,640,866 | 2/1972 | Nishida et al. | 252/62.9 |
| 4,692,422 | 9/1987 | Fujiwara et al. | 501/136 |
| 4,712,156 | 12/1987 | Bardhan | 361/321 |
| 4,959,333 | 9/1990 | Mori et al. | 501/136 |
| 5,004,715 | 4/1991 | Hakotani et al. | 501/136 |
| 5,006,956 | 4/1991 | Kawakita et al. | 361/321 |

Primary Examiner—William R. Dixon, Jr.
Assistant Examiner—Chris Gallo
Attorney, Agent, or Firm—Hoffman, Wasson & Gitler

[57] ABSTRACT

There is provided a new electro-optical effect composition having the general formula:

$$(1-x)Pb(Mg_{\frac{1}{3}}Nb_{\frac{2}{3}})O_3 - xPbTiO_3$$

wherein $0.5 \leq x \leq 0.40$.

2 Claims, 2 Drawing Sheets both magnitu
tive response,
ly with decrea

FIG. 1

ELECTRO-OPTICAL EFFECT COMPOSITION

FIELD OF THE INVENTION

The present invention relates to a new electro-optical material having specified composition. Particularly, it relates to a new compositional material having electro-optical effect.

DESCRIPTION OF THE PRIOR ART

A typical piezoelectric material, PLZT analog material (lanthanum substituted in place of a portional lead PZT [lead zirconia titanate]: $(Pb_{1-x}La_x)(Zr_yTi_z)_{1-x/4}O_3$) has been known to provide a transparent electro-optical material by firing densely, and then, the adjustment of contents of La, Zr and Ti enable to give the electro-optical material having high linear electro-optical coefficient and high quadratic electro-optical coefficient, and such excellent electro-optical effect can be applied to produce a display, an optical memory and an optical suitable shutter. [See G. H. Haerting and C. E. Land, J. Amer. Ceram. Soc., 54, 1 (1971)]

In a series of PLZT ceramics, the composition of $(Pb_{1-x}La_x)(Zr_yTi_z)_{1-x/4}O_3$ wherein x:y:z equals 9:65:35 gives the quadratic electro-optical constant of $9.12 \times 10^{-16}$ $(m^2/V^2)$. Further, the composition wherein x:y:z equals 10:65:35 gives the electro-optical constant of $1.07 \times 10^{-16}$ $(m^2/V^2)$. And, the composition wherein x:y:z equals 11:65:35 gives the electro-optical constant of $0.60 \times 10^{-16}$ $(m^2/V^2)$.

However, PLZT analogue ceramics has shortcomings of brittleness, less toughness.

Although PLZT (lead lanthanum zirconate titanate) materials are suitable for the electro-optical application, they are weak in mechanical properties, and can be electrostrictly distorted or deformed when electric field is applied in use for the electro-optical device. As the PLZT materials are not only the electro-optical materials, but also electrostrictive materials, the devices using these materials are elastically deformed in applying electrical field. When application of signal voltage i.e. for switching, is repeated, the material or the device is repeatedly deformed and may be broken by fatigue.

On the other hands, the PMN (lead magnesium niobate) ceramics is frequently applied to give electrostriction distortion and then can be used to produce an an actuator using the electrostriction properties, and is also attracted to have high toughness and less brittleness. (See K. Uchino, S. Nomura, L. E. Cross, R. E. Newnham and S. J. Jang; J. Material Sci., 16, 569 (1981).)

Moreover, the conventional electro-optical ceramic material needs densification process such as hot pressing, HIP process to produce a defect-free and transparent ceramics.

SUMMARY OF THE INVENTION

With the foregoing considerations in mind, the present invention contemplates the provision of a new electro-optical effect composition.

It is an object of the present invention to provide an electro-optical effect material with high durability and high toughness.

It is another object of the present invention to provide a PMN-PT series composition of electro-optical material having high toughness and a quadratic optical coefficient as high as that of PLZT material.

It is further other object of the present invention to provide a new composition of electro-optical and transparent materials, which were obained by modifying PMN(lead magnesium niobate) series which has both high fracture toughness and high electrostricity.

It is further object of the present invention to provide a ceramic material which can produce more economically and more easily the electro-optical devices.

The electro-optical material for providing a rotation or twist to the vibration direction of the polarized light has "electro-optical effect" or "Kerr effect".

The term of "electro-optical effect" hereinafter refers to as "effect or phenomenon in which the change of birefringence $\Delta n$ is occurred in the material to which the voltage or electric field is applied, in term of $$\Delta n = -(\tfrac{1}{2}) \times n_o^3 R \cdot E^2 \tag{1}$$

wherein $n_o$ is the index of refraction, R is a quadratic electro-optical index, and E is the electric field".

In the electro-optical effect material, the higher R is, the larger the change of the birefringence even upon the application of low electric field. Because the beam can be modulated even with lower voltage, the utilization of this material is worther and wider. The electro-optical effect material or composition is more suitable, the higher the constant R is.

BRIEF DESCRIPTION OF THE DRAWINGS

FIG. 1 is a photography to show a transparent state of a flat plate made of the inventive electro-optical effect material.

DETAILED DESCRIPTION OF PREFERRED EMBODIMENTS

Figure 2:
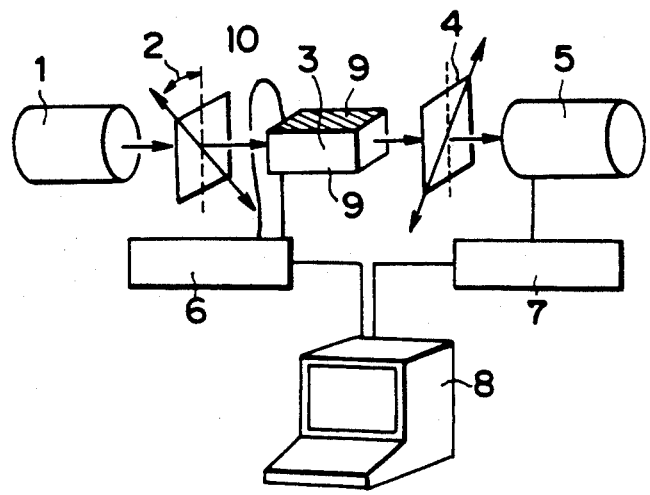
FIG. 2 shows schematically the measurement apparatus to measure the electro-optical effect of the inventive material.

In accordance with the present invention, an electro-optical effect composition of the general formula:

wherein $0.05 \leq x \leq 0.40$ is provided.

PMN (lead magnesium niobate) to be contained in the inventive composition is a typical ferroelectric material, and further, evidences high electrostriction effect. The inventors has investigated in detail the series of PMN materials on the phase diagram and physical properties.

PMN ceramic materials have been developed in use for actuator, and is found to have high toughness among it physical properties.

The inventors have investigated the PMN ceramic materials to be made clear and transparent in form of the solid solution with lead titanate (refer to as "PT"), and developed the appropriate range to be made transparent ceramics.

The inventive newly-found electro-optical effect material has the general formula: $(1-x)Pb(Mg_{\frac{1}{3}}Nb_{\frac{2}{3}})O_3 - xPbTiO_3$, wherein $0.05 \leq x \leq 0.40$, and is a solid solution of lead magnesium niobate and lead titanate.

Accordingly, as the starting materials, various kinds of inorganic materials can be used, such as oxide, carbonate, sulfate, and hydroxide, and alkoxide and organic metal compounds and the complex salt consisting of of respective component elements can be used. The components of the inventive electro-optical effect material are prepared in the mixture of the powders of the above-mentioned starting materials in the desired ratio, or the desired composition, and then the resulting mixture is fired ordinarily in an alumina crucble and milled to form a prefired preparation for the production of the desired electro-optical material or composition. Then, the resulting prefired particulate mixture is moulded and fired into a sintered body of the inventive electro-optical effect material.

One of the methods of producing the densified or enough sintered material is a hot pressing process of the prefired particulate mixture to form the desired densified and clear electro-optical effect material. The conditions for such hot pressing process such as a hot pressing temperature, applied pressure are depending on the composition of the prefired powder, the size of the particles of the mixture, and can be appropriated predetermined. Alternatively, the ordinary firing process can be used to produce a clear and transparent ceramics of the desired electro-optical composition from wet-milled particulate material of the mixture.

Such firing of the inventive material can be carried out in a crucible or sheath made of alumina or magnesia, so as to minimize the vaporization of lead, by adjusting the atmosphere for firing.

The inventive composition is appropriate for application to many kinds of electro-optical devices, being used as a clear and transparent ceramics of the electro-optical effect material.

The present invention is further illustrated by the following examples to show the electro-optical effect composition, and its properties, but should not be interpreted for the limitation of the invention.

EXAMPLE

Each particulate material of $MgCO_3$, $PbO$, $TiO_2$, and $Nb_2O_5$ was used for the starting materials. Powders of $MgCO_3$, $TiO_2$, and $Nb_2O_5$ were weighed accurately and respectively in a desired amount, and fired at the temperature of 1,000° C., and then, the accurately weighed powder of PbO was added respectively to. In this way, each of the mixture of MgO, PbO, $TiO_2$, and $Nb_2O_5$ in the desired ratios corresponding each to the compositions of the general formula:

$(1-x)Pb(Mg_{\frac{1}{3}}Nb_{\frac{2}{3}})O_3 - xPbTiO_3$, wherein x is respectively 0, 0.05, 0.1, 0.2, 0.3, 0.4 and 0.5 was prepared. The resulting mixtures were dried, and fired at the temperature of 850° C. for period of ten hours, and the fired mixtures were milled in a wet ball mill, and then, dried, and fired at the temperature of 900° C. for further period of ten hours. Therefore, the starting mixtures was prepared in a two stage firing.

Such prefired particulate mixture was pressed under the pressure of 620 kgf/cm² at a room temperature to form a preform, and then heated to the temperature of 1,200° C. and hot pressed under the pressure of 200 kgf/cm² in an oxidizing atmosphere, to produce the desired electro-optical effect sample.

The resulting samples of the compositions of the above-mentioned general formula where x is respective 0.05, 0.1, 0.2 and 0.4 are found to have a pseudo cubic phase by a X-ray diffraction analysis.

It is considered that because the sample becomes a pseudo cubic crystal, the sample is made isotropic so that the transmittance would be increased.

The transmittance (? transmissivity) of the resulting samples were measured, and the result is that the composition of the above-mentioned general formula where x is from 0 to 0.4 has the transmittance higher than 5%, and the maximum transmittance is about 25% at the point where x is about 0.1.

Figure 1:
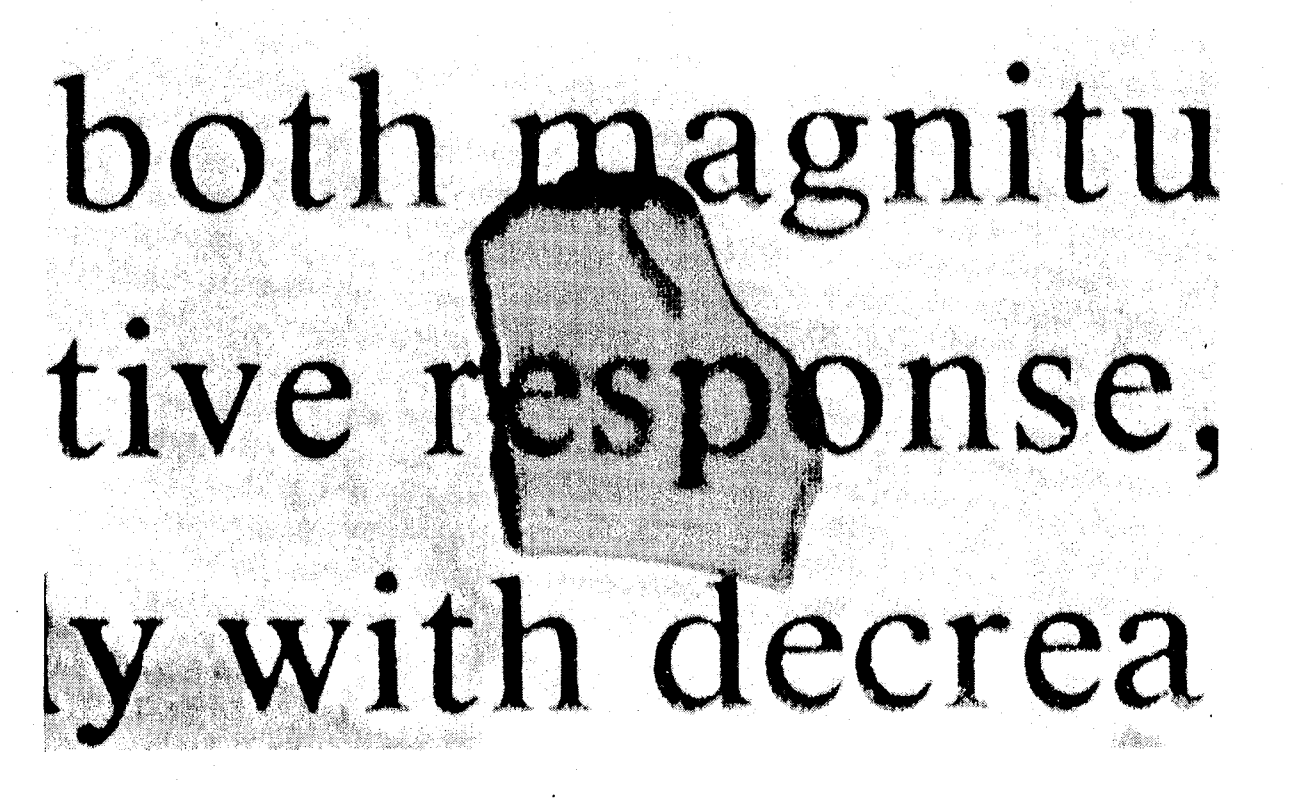

FIG. 1 is a photography to show a transmittance state of a flat plate made of the inventive electro-optical effect material of the general formula where x is 0.1, having the thickness of 0.52 mm.

Electro-optical constant was measured on the above prepared samples by the following method. The sample to be measured is inserted (or sandwiched with) and fixed between two polarized plates having mutual perpendicular polarizing directions (or under crossed Nichols), which sample has two electrodes on both surfaces to apply an electric field to the sample, and the polarized beam incidences into the sample of the electro-optic effect composition. The intensities of the transmitted beam which has transmitted through the sample were measured with changing the electric field applied to by changing the voltage between the electrodes. The measurement apparatus is shown schematically in FIG. 2.

As a light source, a He-Ne laser 1 is used to emit a coherent beam. The polarized plates 2 and 4 have mutually perpendicular polarization directions (cross-Nicol) as shown. The sample 3 of the inventive electro-optic effect composition is fixed between the two plates 2 and 4. The electric field is applied to the sample through both electrodes 9 and 10 fixed on both surfaces of the sample 3, along with the direction mutually 45° from the polarizing direction of the polarization plates. When a certain voltage is applied between the electrodes 9, the birefringence generated in the sample 3 is increased or changed and makes the retardation of the transmitted beam 11 raised so as to change the intensities of the transmitted beam from the polarization plate 4. The intensities of the transmitted beam is detected by a photo detector 5, and the detected signal or output is measured by the volt meter 7, and such output is put into a computer 8. On the other hand, the voltage applied through a line 10 from a source 6 to the electrodes 9 and 10 is also put into the computer 8. Then, the computer will make a graph of plotted on co-ordinate of the light intensity of transmitting laser beam and on voltage applied to the sample, as shown in FIG. 3.

After the samples of the inventive material were prepared, the application voltages and the intensities of the beam which has passed through the samples were measured. The size of the samples was as follows; the distance between the electrodes is 1.77 mm, and the length of the beam passage is 0.44 mm.

Figure 3:
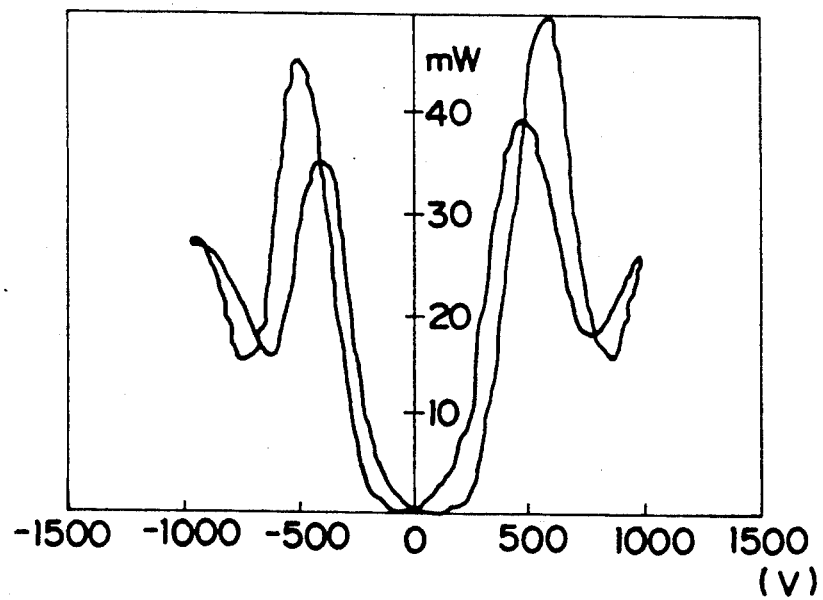
FIG. 3 is a graph plotted on co-ordinate of change of the intensity of transmitting laser beam and on voltage applied to the inventive material plate.

FIG. 3 is a graph of plotted on co-ordinate of change of the light intensity of transmitting laser beam and on voltage applied to the inventive material plate. The graph was produced in a recorder by a computer 8.

The intensity I of transmitting laser beam is indicated as follows;

$$I = I_o \sin^2(\Gamma\pi/\lambda) \qquad (2)$$

wherein $I_o$ is an incident light intensity, $\lambda$ is a wavelength, and $\Gamma$ is retardation.

In the equation (2), the retardation $\Gamma$ is increased, and becomes the first maximum, when the equation (3) is formed.

$$\Gamma \cdot \pi/\lambda = \pi/2 \quad (3)$$

and when the equation (4) is:

$$\Gamma = \lambda/2 \quad (4)$$

In the other hand, $\Gamma$ (retardation) is a retardation of phase of output polarized beam when the electric field is applied on the samples, and therefore, can be referred to as the product of the length $l$ of the sample in the direction of the beam, and the birefringence $\Delta n$.

$$\Gamma = \Delta n \cdot l \quad (5)$$

The equation (6) is induced from the equations (4) and (5)

$$\Delta n = \lambda/2l \quad (6)$$

On the other hand, in the quadratic electro-optical effect, the birefringence $\Delta n$ has the relation with the applied electric field in the form of the equation (1).

$$\Delta n = -(\tfrac{1}{2})n^3 R \cdot E^2 \quad (1)$$

Accordingly, the quadratic electro-optical index R represents as follows.

$$R = -\lambda/l \cdot n^3 E^2 \quad (7)$$

Therefore, the index R is given from the wavelength $\lambda$ of the transmitting beam, the length $l$ of the sample (transmitting length), the index n of refraction, and the applied electric field E.

The quadratic electro-optical index R was estimated from the graph of FIG. 3; $R = 6.7 \times 10^{-16}$ (m$^2$/V$^2$). In the same way, when $x = 0.05$ of the composition, $R = 5.2 \times 10^{-16}$ (m$^2$/V$^2$). Further, when $x = 0.2$ of the composition, $R = 10 \times 10^{-16}$ (m$^2$/V$^2$). Therefore, the index of the inventive composition is found to be competitive to that of PLZT (lead lanthanum zirconate titanate) material.

The fracture toughness of the inventive materials was measured. The measurement method follows the disclosure in "See Micro pressing breakage method [Bishouasshi Atshunyuu Hakaihou] K. Niihara, Ceramics, Vol. 20, 12 (1985)" Micro Vicker's Hardness tester was used to measure the toughness by measuring the length of four cracks generated on the surface of the sample in form of Vicker's press marks (indents), which cracks occur along with extension of the diagonal lines of the marks.

Table 1 shows the transmittances, the electro-optical effect constants and toughness $K_{IC}$ values as measured in accordance with the above-described methods, in regard with respective compositions, and further for reference, in regard with the prior art material PLZT (lead lanthanum zirconate titanate).

The transmittances of the samples are more than 5% in the range where x is from 0.05 to 0.4, and is 25% at the maximum value when x is 0.1. It is clearly apparent for the inventive electro-optical effect material to be substantially practical. The material where x is higher than 0.4 becomes in orthogonal phase apart from the pseudo cubic phase, and therefore, the transmittance will be decreased to lower than 5%, and could not be used in practice in some extent.

It was found that the electro-optical constants of the samples where x is from 0.05 to 0.2 are competitive to that of PLZT material, or more in form of the quadratic index. Further, the fracture toughness: $K_{IC}$ values of the samples of the composition of the general formula where x is from 0.05 to 0.2 was found to be 1.7 to 2 times higher than that of PLZT material.

While the toughness: $K_{IC}$ value strength of PLZT material is $1.0 \times 10^6$ MN/m$^{3/2}$, $K_{IC}$ values of the inventive materials: PMN-PT compositions are two times or more of that of PLZT material.

Accordingly, the production of the solid solution of PMN with PT including in an amount of 5 mol % to 40 mol % (corresponding to the range of $x = 0.05$ to 0.4) can provide the material with higher toughness, and competitive electro-optical constant, and transmittance.

TABLE 1

| Composition | Transparency 0.5 mm thick | Electro-optical constant R($\times 10^{-18}$ m$^2$/V$^2$) | Toughness $K_{IC}$(MN/m$^{3/2}$) |
| --- | --- | --- | --- |
| PMN | 15% | — | — |
| 0.98 PMN—0.02 PT | 15% | 6.4 | |
| 0.95 PMN—0.05 PT | 15% | 5.2 | $1.7 \times 10^6$ |
| 0.9 PMN—0.1 PT | 25% | 6.7 | $2.0 \times 10^6$ |
| 0.88 PMN—0.12 PT | | 9.1 | |
| 0.8 PMN—0.2 PT | 15% | 10. | $1.7 \times 10^6$ |
| 0.7 PMN—0.3 PT | 10% | — | — |
| 0.6 PMN—0.4 PT | 5% | — | — |
| 0.5 PMN—0.5 PT | 2% | — | — |
| PLZT9/65/35 | 60% | 9.1 | $1.0 \times 10^6$ |
| PLZT10/65/35 | 60% | 1.1 | $1.0 \times 10^6$ |
| PLZT11/65/35 | 60% | 0.6 | — |

PMN is lead magnesium niobate, PT is lead titanate, and i.e. 0.95 PMN-0.05 PT means a solid solution of the indicated ratio of PMN and PT. PLZT is a conventional lead lanthanum zirconate titanate in the indicated ratio.

It is apparent that the composition of the present invention has competitive electro-optical effect to that of PLZT material, and higher toughness and transmittance.

Therefore, the inventive material can be used in severer condition, such as operated by higher signal voltage, and has high durability so that it is difficult to be broken even in longer operation with higher frequency.

Secondly, it can enable to fabricate easily a miniatured and light-weighted and thin-formed apparatus with good performance. The cost performance can be further obtained.

While the present invention has been described with reference to the particular illustrative embodiments, it is not to be restricted by those embodiments but only the appended claims. It is to be appreciated that those skilled in the art can change or modify the embodiments without departing from the scope and spirit of the present invention.

We claim:

1. An electro-optical effect composition consisting essentially of the general formula:

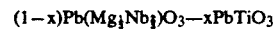

$(1-x)Pb(Mg_{\frac{1}{3}}Nb_{\frac{2}{3}})O_3 - xPbTiO_3$ wherein $0.05 \leq x \leq 0.40$.

2. The electro-optical effect composition in accordance with claim 1, wherein said composition has $K_{IC}$ value higher than $1.5 \times 10^6$ MN/m$^{3/2}$.

* * * * *